United States Patent [19]
Hester, Jr.

[11] 3,894,025
[45] July 8, 1975

[54] 1-PIPERAZINO-6-PHENYL-4H-S-TRIAZOLO[4,3-A][1,4]-BENZODIAZEPINE COMPOUNDS

[75] Inventor: Jackson B. Hester, Jr., Galesburg, Mich.

[73] Assignee: The Upjohn Company, Kalamazoo, Mich.

[22] Filed: Mar. 21, 1974

[21] Appl. No.: 453,195

[52] U.S. Cl........ 260/268 TR; 71/92; 260/239.3 D; 424/250
[51] Int. Cl............................................. C07d 57/02
[58] Field of Search.................. 260/268 TR, 308 R

[56] References Cited
UNITED STATES PATENTS
3,751,426  8/1973  Hester.............................. 260/308 R
FOREIGN PATENTS OR APPLICATIONS
2,118,028  11/1972  France............................ 260/308 R

*Primary Examiner*—Alton D. Rollins
*Attorney, Agent, or Firm*—Hans L. Berneis

[57] ABSTRACT

1-piperazino-6-phenyl-4H-s-triazolo[4,3-a][1,4]benzodiazepines of the formula II:

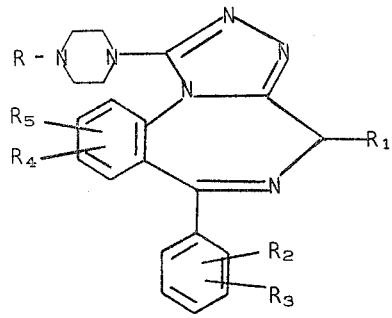

II wherein R is hydrogen, alkyl of 1 to 3 carbon atoms, inclusive, or β-hydroxyethyl; wherein $R_1$ is hydrogen or alkyl defined as above; and wherein $R_2$, $R_3$, $R_4$ and $R_5$ are hydrogen, alkyl as defined above, fluoro, chloro, bromo, nitro or trifluoromethyl, are obtained by reacting a compound of the formula I:

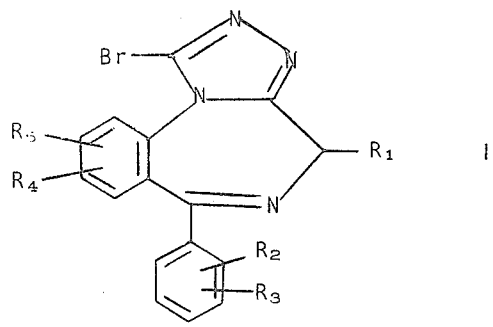

I wherein $R_1$, $R_2$, $R_3$, $R_4$ and $R_5$ are defined as above, with a piperazine of the formula:

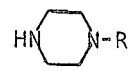

wherein R is defined as above.

The compounds of the formula II and their pharmacologically acceptable acid addition salts thereof, have tranquilizing, sedative and anti-depressant effects, and are useful for suppression of anxiety and depression in mammals and birds.

10 Claims, No Drawings

1-PIPERAZINO-6-PHENYL-4H-S-TRIAZOLO[4,3-A][1,4]-BENZODIAZEPINE COMPOUNDS

BACKGROUND OF THE INVENTION

FIELD OF THE INVENTION

This invention is directed to a new class of organic compounds and is more particularly concerned with 1-piperazino-6-phenyl-4H-s-triazolo[4,3-a][1,4]benzodiazepines (II) and a process of production therefor.

The novel compounds II and the process of production therefor can be illustratively represented as follows:

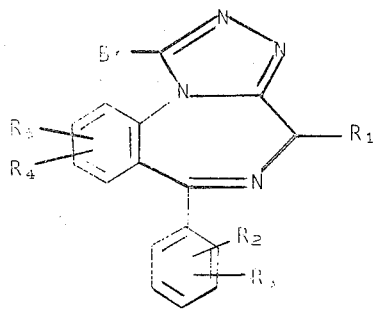

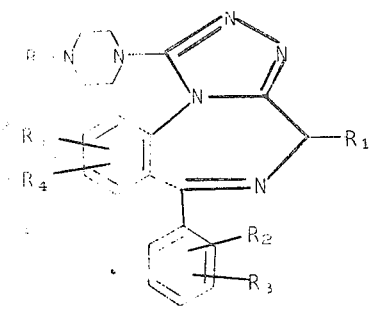

wherein R is hydrogen, alkyl of 1 to 3 carbon atoms inclusive, or β-hydroxyethyl; wherein $R_1$ is hydrogen or alkyl defined as above; and wherein $R_2$, $R_3$, $R_4$ and $R_5$ are hydrogen, alkyl as defined above, fluoro, chloro, bromo, nitro or trifluoromethyl.

The invention further comprises the pharmacologically acceptable acid addition salts of the compounds of formula II.

The more desirable products are of the formula II A:

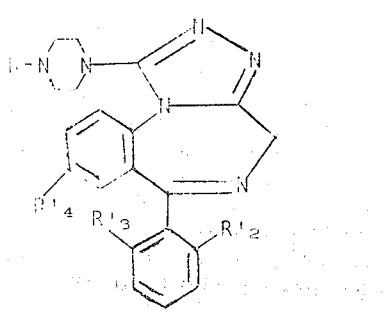

wherein R is hydrogen, alkyl of 1 to 3 carbon atoms, inclusive, and β-hydroxyethyl; $R'_2$ and $R'_3$ are hydrogen, fluoro or chloro, and $R'_4$ is hydrogen, fluoro, chloro, bromo, nitro, trifluoromethyl, and the pharmacologically acceptable acid addition salt of the compounds of formula II A.

The most desirable products are of the formula IIB:

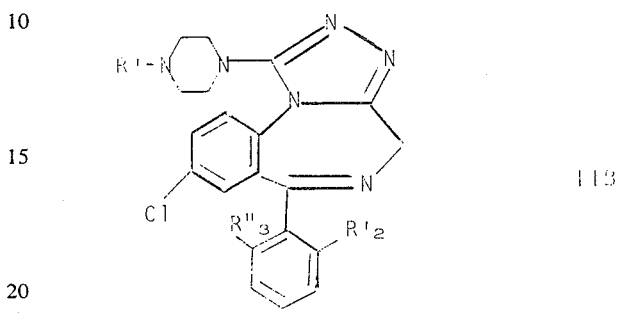

wherein R' is methyl or β-hdyroxyethyl; wherein $R'_2$ is hydrogen, chloro of fluoro, and wherein $R''_3$ is hdyrogen or fluoro, and the pharmacologically acceptable acid addition salts thereof.

The process of this application comprises: heating to 100° to 150° C. compound of formula I with an excess of the selected piperazine of the formula:

wherein R is defined as hereinabove, for a period of 6 to 24 hours, to obtain the corresponding compound of formula II.

DESCRIPTION OF THE PREFERRED EMBODIMENT

Lower alkyl groups of 1 to 3 carbon atoms, inclusive, are exemplified by methyl, ethyl, propyl, and isopropyl.

The novel compounds of the formula II including compounds II A and II B and the acid addition salts thereof, have sedative, tranquilizing and antidepressant effects in mammals and birds.

The acid addition salts of compounds of formula II, including II A and II B contemplated in this invention, are the hydrochlorides, hydrobromides, hydriodides, sulfates, phosphates, cyclohexanesulfamates, methanesulfonates, and the like, prepared by reacting a compound of formula II with an excess of the selected pharmacologically acceptable acid.

Sedative effects of the novel compounds II were shown by the following tests in mice:

Chimney test: [Med. Exp. 4, 145 (1961)]:
The test determines the ability of mice to back up and out of a vertical glass cylinder within 30 seconds. At the effective dosage, 50% of the mice failed doing it.

Dish test: Mice in Petri dishes (10 cm. diameter, 5 cm. high, partially embedded in wood shavings), climb out in a very short time, when not treated. Mice remaining in the dish for more than 3 minutes indicates tranquilization. $ED_{50}$ equals the dose of test compound at which 50% of the mice remain in the dish.

Pedestal test: The untreated mouse leaves the pedestal in less than a minute to climb back to the floor of the standard mouse box. Tranquilized mice will stay on the pedestal for more than 1 minute.

Nicotine antagonism test: Mice in a group of 6 are injected with the test compound. Thirty minutes later the mice including control (untreated) mice are injected with nicotine salicylate (2 mg./kg.). The control mice show overstimulation, i.e., (1) running convulsions followed by (2) tonic extensor fits; followed by (3) death.

In addition the novel compounds potentiated the lethal effects of yohimbine antagonized oxotremorine hypothermia and potentiated apomorphine gnawing, which are all tests known in the art to show antidepressant activity.

Thus, these compounds are useful for tranquilization, sedation, treating anxieties, and also useful as antidepressants in mammals and birds.

The pharmaceutical forms contemplated by this invention include pharmaceutical compositions suited for oral, parenteral, and rectal use, e.g., tablets, powder packets, cachets, dragees, capsules, solutions, suspensions, sterile injectable forms, suppositories, bougies, and the like. Suitable diluents or carriers such as carbohydrates (lactose), proteins, lipids, calcium phosphate, corn starch, stearic acid, methylcellulose and the like may be used as carriers or for coating purposes. Water or oil, e.g., coconut oil, sesame oil, safflower oil, cottonseed oil, peanut oil may be used for preparing solutions or suspensions of the active drug. Sweetening, coloring and flavoring agents may be added.

For mammals and birds, food premixes with starch, oatmeal, dried fishmeat, fishmeal, flour and the like can be prepared.

As tranquilizer the compounds of formula II can be used in dosages of 0.05–10 mg./kg.; preferably in unit dosages of 0.1–5 mg./kg. in oral or injectable preparations as described above, to alleviate tension and anxiety in mammals, or birds, such as e.g., occurs when animals are in travel.

Other acid addition salts of the compounds of formula II can be made, such as the fluosilicic acid addition salts which are useful mothproofing compounds or the trichloroacetates useful as herbicides against Johnson grass, Bermuda grass, yellow foxtail and green foxtail, and quack grass.

The starting materials of formula I of this invention are prepared as shown in the Preparation:

In carrying out the process of this invention, a selected 1-bromo-6-phenyl-4H-s-triazolo[4,3-a][1,4]-benzodiazepine 1, is heated in a considerable excess of the selected piperazine

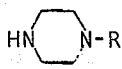

in which R is defined as hereinabove. The piperazine simultaneously serves as solvent and reactant: This mixture is heated between 100° to 150° C. for a period of 6 to 24 hours. After the reaction is terminated the product is isolated and purified by conventional procedures e.g. extraction, evaporation of the extract, crystallization and chromatography.

The following preparations and examples are illustrative of the processes and products of the present invention, but are not to be construed as limiting.

PREPARATION 1

8-chloro-6-phenyl-4H-s-triazolo[4,3-a][1,4]-benzodiazepine.

A solution of 5.74 g. (0.02 mole) of 1,3-dihydro-7-chloro-5-phenyl-2H-1,4-benzodiazepine-2-thione and 3.6 g. (0.6 mole) of formic acid hydrazide in 200 ml. of 1-butanol was heated under reflux for 3 hours 45 minutes with a slow stream of nitrogen passing through the reaction mixture to remove the hydrogen sulfide formed. The reaction mixture was concentrated, and the residue was suspended in water. The solid was collected by filtration, dissolved in methylene chloride and dried over anhydrous potassium carbonate. Removal of the solvent gave a residue which was recrystallized from ethyl acetate-Skellysolve B hexanes to give 8-chloro-6-phenyl-4H-s-triazolo[4,3-a][1,4]benzodiazepine of melting point 228°–229° c.

In the same manner given in Preparation 1 by heating other 1,3-dihydro-5-phenyl-2H-1,4-benzodiazepine-2-thiones with formic acid hydrazide, other 6-phenyl-4H-s-triazolo-[4,3-a][1,4]benzodiazepines are produced. Representative compounds, thus produced include:

8-chloro-6-(2,6-difluorophenyl)-4H-s-triazolo[4,3-a][1,4]-benzodiazepine;
8-chloro-6-(o-chlorophenyl)-4H-s-triazolo[4,3-a][1,4]-benzodiazepine;
8-bromo-6-phenyl-4H-s-triazolo[4,3-a][1,4]benzodiazepine;
8-nitro-6-(o-chlorophenyl)-4H-s-triazolo[4,3-a][1,4]-benzodiazepine;
8-chloro-4-methyl-6-(2,6-difluorophenyl)-4H-s-triazolo-[4,3-a][1,4]benzodiazepine;
9-chloro-6-(o-chlorophenyl)-4H-s-triazolo[4,3-a][1,4]-benzodiazepine;
8-trifluoromethyl-6-phenyl-4H-s-triazolo[4,3-a][1,4]-benzodiazepine.
8-nitro-6-phenyl-4H-s-triazolo[4,3-a][1,4]benzodiazepine;
10-ethyl-6-phenyl-4H-s-triazolo[4,3-a][1,4]benzodiazepine;
10-trifluoromethyl-6-(2,4-dimethylphenyl)-4H-s-triazolo-[4,3-a][1,4]benzodiazepine;
9-methyl-6-(2,6-difluorophenyl)-4H-s-triazolo[4,3-a][1,4]-benzodiazepine;
7,10-dichloro-6-(m-nitrophenyl)-4H-s-triazolo[4,3-a][1,4]-benzodiazepine;
4,7,9-triethyl-6-[P-(trifluoromethyl)phenyl]-4H-s-triazolo-[4,3-a][1,4]benzodiazepine;
8-chloro-6-(o-nitrophenyl)-4H-s-triazolo[4,3-a][1,4]-benzodiazepine;
8-bromo-9-nitro-6-(o-methylphenyl)-4H-s-triazolo[4,3-a][1,4]benzodiazepine;
7-trifluoromethyl-8-bromo-6-(o-chlorohenyl)-4H-s-triazolo[4,3-a][1,4]benozodiazepine;
7-isopropyl-8-fluoro-6-phenyl-4H-s-triazolo[4,3-a][1,4]-benzodiazepine;
8-chloro-6-(m-isopropylphenyl)-4H-s-triazolo[4,3-a][1,4]-benzodiazepine;
9-fluoro-4-methyl-6-(m-bromophenyl)-4H-s-triazolo[4,3-a]-[1,4]benzodiazepine;

8-ethyl-6-(o-nitrophenyl)-4H-s-triazolo[4,3-a][1,4]-benzodiazepine;
7-propyl-6-(o-bromophenyl)-4H-s-triazolo[4,3-a][1,4]-benzodiazepine;
8-trifluoromethyl-4-propyl-6-phenyl-4H-s-triazolo[4,3-a]-[1,4]benzodiazepine;
10-fluoro-7-chloro-6-[p-trifluoromethylphenyl]-4H-s-triazolo[4,3-a][1,4]benzodiazepine;
8-fluoro-4-ethyl-6-(p-nitrophenyl)-4H-s-triazolo[4,3-a]-]1,4]benzodiazepine;
8-trifluoromethyl-6-phenyl-4H-s-triazolo[4,3-a][1,4]-benzodiazepine;
6-(o-chlorophenyl)-4H-s-triazolo[4,3-a][1,4]benzodiazepine;
6-phenyl-4H-s-triazolo[4,3-a][1,4]benzodiazepine;
and the like.

PREPARATION 2

1-bromo-8-chloro-6-phenyl-4H-s-triazolo[4,3-a]-[1,4]benzodiazepine.

A stirred mixture of 8-chloro-6-phenyl-4H-s-triazolo-[4,3-a][1,4]benzodiazepine (14.7 g., 0.05 mole), N-bromo-succinimide (8.9 g., 0.05 mole), and carbon tetrachloride (1 liter) was refluxed, under a nitrogen atmosphere for 4 hours, cooled and concentrated in vacuo. The residue was mixed with water and extracted with chloroform. The extract was dried over anhydrous potassium carbonate and concentrated. Crystallization of the residue from ethyl acetate gave 7.74 g. of 1-bromo-8-chloro-6-phenyl-4H-s-triazolo[4,3-a][1,4]benzodiazepine of melting point 202.5°–206° C. The mother liquor was concentrated and chromatographed on silica gel (500 g.) with 2.5% methanol-97.5% chloroform. The product obtained from the column was recrystallized from ethyl acetate to give 3.01 g. of 1-bromo-8-chloro-6-phenyl-4H-s-triazolo[4,3-a][1,4]-benzodiazepine of melting point 205°–207°. The analytical sample had a melting point of 202°–203.5° C.

Anal. calcd. for $C_{16}H_{10}BrClN_4$: C, 51.43; H, 2.70; Br, 21.39; Cl, 9.49; N, 15.00. Found: C, 51.32; H, 2.98; Br, 21.14; Cl, 9.59; N, 15.20.

PREPARATION 3

1-bromo-8-chloro-6-(o-chlorophenyl)-4H-s-triazolo[4,3-a][1,4]benzodiazepine.

In the manner given in Preparation 2, 8-chloro-6-(o-chlorophenyl)-4H-s-triazolo[4,3-a][1,4]benzodiazepine was treated with N-bromosuccinimide in chloroform to give 1-bromo-8-chloro-6-(o-chlorophenyl)-4H-s-triazolo[4,3-a]-[1,4]benzodiazepine.

PREPARATION 4

1-bromo-8-chloro-6-(o-fluorophenyl)-4H-s-triazolo[4,3-a][1,4]benzodiazepine.

In the manner given in Preparation 2, 8-chloro-6-(o-fluorophenyl)-4H-s-triazolo[4,3-a][1,4]benzodiazepine was treated with N-bromosuccinimide in carbon tetrachloride to give 1-bromo-8-chloro-6-(o-fluorophenyl)-4H-s-triazolo-[4,3-a][1,4]benzodiazepine.

PREPARATION 5

1-Bromo-8-chloro-6-(o-nitrophenyl)-4H-s-triazolo[4,3-a][1,4]benzodiazepine.

In the manner given in Preparation 2, 8-chloro-6-(o-nitrophenyl)-4H-s-triazolo[4,3-a][1,4]benzodiazepine was treated with N-bromosuccinimide in carbon tetrachloride to give 1-bromo-8-chloro-6-(o-nitrophenyl)-4H-s-triazolo[4,3-a][1,4]benzodiazepine.

PREPARATION 6

1-Bromo-8-chloro-6-(2,6-difluorophenyl)-4H-s-trizolo[4,3-a][1,4]benzodiazepine.

In the manner given in Preparation 2, 8-chloro-6-(2,6-difluorophenyl)-4H-s-triazolo[4,3-a][1,4]benzodiazepine was treated with N-bromosuccinimide in chloroform to give 1-bromo-8-chloro-6-(2,6-difluorophenyl)-4H-s-triazolo[4,3-a][1,4]benzodiazepine.

PREPARATION 7

7-Trifluoromethyl-1,8-dibromo-6-(o-chlorophenyl)-4H-s-triazolo[4,3-a][1,4]benzodiazepine.

In the manner given in Preparation 2, 7-trifluoromethyl-8-bromo-6-(o-chlorophenyl)-4H-s-triazolo[4,3-a][1,4]-benzodiazepine was treated with N-bromosuccinimide in chloroform to give 7-trifluoromethyl-1,8-dibromo-6-(o-chlorophenyl)-4H-s-triazolo[4,3-a][1,4]benzodiazepine.

PREPARATION 8

1-Bromo-8-fluoro-4-ethyl-6-(p-nitrophenyl)-4H-s-triazolo[4,3-a][1,4]benzodiazepine.

In the manner given in Preparation 2, 8-fluoro-4-ethyl-6-(p-nitrophenyl)-4H-s-triazolo[4,3-a][1,4]benzodiazepine was treated with N-bromoacetamide in carbontetrachloride to give 1-bromo-8-fluoro-4-ethyl-6-(p-nitrophenyl)-4H-s-triazolo[4,3-a][1,4]benzodiazepine.

PREPARATION 9

1,8-dibromo-9-nitro-6-(o-methylphenyl)-4H-s-triazolo[4,3-a][1,4]benzodiazepine.

In the manner given in Preparation 2, 8-bromo-9-nitro-6-(o-methylphenyl)-4H-s-triazolo[4,3-a][1,4]-benzodiazepine was treated with N-bromosuccinimide in chloroform to give 1,8-dibromo-9-nitro-6-(o-methylphenyl)-4H-s-triazolo[4,3-a][1,4]benzodiazepine.

PREPARATION 10

1-Bromo-8-trifluoromethyl-6-phenyl-4H-s-triazolo[4,3-a ][1,4]benzodiazepine.

In the manner given in Preparation 2, 8-trifluoromethyl-6-phenyl-4H-s-triazolo[4,3-a][1,4]benzodiazepine was treated with N-bromosuccinimide in chloroform to give 1-bromo-8-trifluoromethyl-6-phenyl-4H-s-triazolo-[4,3-a][1,4]benzodiazepine.

In the manner given in Preparations 2 through 10 other 1-bromo-6-phenyl-4H-s-triazolo[4,3-a][1,4]benzodia-zepines of formula 1 serving as starting compounds can be made. Representative compounds thus obtained comprise:

1-bromo-8-nitro-6-(o-chlorophenyl)-4H-s-triazolo[4,3-a]-[1,4]benzodiazepine.
1,8-dibromo-6-phenyl-4H-s-triazolo[4,3-a][1,4]benzodiazepine;
1-bromo-9-chloro-6-(o-chlorophenyl)-4H-s-triazolo[4,3-a][1,4]-benzodiazepine;
1-bromo-8-trifluoromethyl-6-phenyl-4H-s-triazolo[4,3-a][1,4]-benzodiazepine;
1-bromo-8-nitro-6-phenyl-4H-s-triazolo[4,3-a][1,4]-benzodiazepine;
1-bromo-10-ethyl-6-phenyl-4H-s-triazolo[4,3-a][1,4]-benzodiazepine;
1-bromo-10-trifluoromethyl-6-(2,4-dimethylphenyl)-4H-s-triazolo[4,3-a][1,4]benzodiazepine;
1-bromo-9-methyl-6-(p-fluorophenyl)-4H-s-triazolo[4,3-a]-[1,4]benzodiazepine;
1-bromo-7,10-dichloro-6-(m-nitrophenyl)-4H-s-triazolo[4,3-a]-[1,4]benzodiazepine;
1-bromo-4,7,9-triethyl-6-[o-(trifluoromethyl)phenyl]-4H-s-triazolo[4,3-a][1,4]benzodiazepine;
1-bromo-8-chloro-6-(o-nitrophenyl)-4H-s-triazolo-[4,3-a]-[1,4benzodiazepine;
1-bromo-8-fluoro-6-phenyl-4H-s-triazolo[4,3-a][1,4-benzodiazepine;
1-bromo-8-chloro-6-(m-isopropylphenyl)-4H-s-triazolo[4,3-a]-[1,4-benzodiazepine;
1-bromo-9-fluoro-4-methyl-6-(m-bromophenyl)-4H-s-triazolo-[4,3-a][1,4 benzodiazepine;
1-bromo-8-ethyl-6-(o-nitrophenyl)-4H-s-triazolo[4,3-a][1,4]-benzodiazepine;
1-bromo-7-propyl-6-(o-bromophenyl)-4H-s-triazolo[4,3-a][1,4]-benzodiazepine;
1-bromo-8-trifluoromethyl-4-propyl-6-phenyl-4H-s-triazolo-[4,3-a][1,4]benzodiazepine;
1-bromo-10-fluoro-7-chloro-6-[p-(trifluoromethyl)phenyl]-4H-s-triazolo[4,3-a][1,4]benzodiazepine; and the like.

EXAMPLE 1

8-chloro-1-(4-methylpiperazino)-6-phenyl-4H-s-triazolo[4,3-a][1,4]benzodiazepine.

A stirred mixture of 1-bromo-8-chloro-6-phenyl-4H-s-triazolo-[4,3-a][1,4]benzodiazepine (0.748 g., 0.002 mole) and 4-methylpiperazine (4 ml), under nitrogen, was warmed during 3 hours to 110° C. and kept at 100°–110° C. for an additional 10 hours 25 minutes. The cooled mixture was poured into ice water, neutralized with sodium bicarbonate, and extracted with chloroform. The extract was washed with brine, dried over anhydrous potassium carbonate, and concentrated. The residue was dissolved in ethyl acetate and allowed to crystallize. This material was recrystallized from methanol-ethyl acetate to give 0.367 g. of melting point 239.5°–240.5° C. and 0.061 g. of melting point 238.5°–240° C. (54.5% yield) of 8-chloro-1-(4-methylpiperazino)-6-phenyl-4H-s-triazolo[4,3-a][1,4]-benzodiazepine. The analytical sample had a melting point of 238°–239.5° C.

Anal. Calcd. for $C_{21}H_{21}ClN_6$: C, 64.20; H, 5.39; Cl, 9.02; N, 21.39. Found: C, 64.55; H, 5.53; Cl, 9.04; N, 21.18.

Example 2

8-Chloro-1-[4-(2-hydroxyethyl)piperazino]-6-phenyl-4H-s-triazolo[4,3-a][1,4]benzodiazepine.

A stirred mixture of 1-bromo-8-chloro-6-phenyl-4H-s-triazolo-[4,3-a][1,4]benzodiazepine (5,609, 0.015 mole) and N-(β-hydroxyethyl)piperazine (30 ml) was warmed, under nitrogen, at 130° for 20 hours. The cooled mixture was diluted with water and extracted with methylene chloride. The extract was washed with water, dried over anhydrous sodium sulfate, and concentrated. The residue was chromatographed on silica gel (550 g) with 2% triethylamine-13% methanol-85% ethyl acetate, and the resulting product was crystallized from methylene chloride ethyl acetate to give 3.37 g. of 8-chloro-1-[4-(2-hydroxyethyl)piperazino]-6-phenyl-4H-s-triazolo[4,3-a][1,4]benzodiazepine of melting point 219°–224° C.

Anal. calcd. for $C_{22}H_{23}ClN_6O$: C, 62.48; H, 5.48; Cl, 8.38; N, 19.81. Found: C, 62.46; H, 5.44; Cl, 8.43; N, 19.49.

EXAMPLE 3

8-chloro-1-(4-methylpiperazino)-6-(o-chlorophenyl)-4H-s-triazolo[4,3-a][1,4]benzodiazepine.

In the manner given in Example 1, 1-bromo-8-chloro-6-(o-chlorophenyl)-4H-s-triazolo[4,3-a][1,4]benzodiazepine is heated with excess of 4-methylpiperazine to give 8-chloro-1-(4-methylpiperazino)-6-(o-chlorophenyl)-4H-s-triazolo[4,3-a][1,4]benzodiazepine.

EXAMPLE 4

8-chloro-1-[4-(2-hydroxyethyl)piperazino]-6-(o-chlorophenyl)-4H-s-triazolo[4,3-a][1,4]benzodiazepine.

In the manner given in Example 2, 1-bromo-8-chloro-6-(o-chlorophenyl)-4H-s-triazolo[4,3-a][1,4]benzodiazepine.

In the manner given in Example 2, 1-bromo-8-chloro-6-(o-chlorophenyl)-4H-s-triazolo[4,3-a][1,4]benzodiazepine is heated with N-(β-hydroxyethyl)piperazine) to give 8-chloro-1-[4-(2-hydroxyethyl)piperazino]-6-(o-chlorophenyl)-4H-s-triazolo[4,3-a][1,4]benzodiazepine.

EXAMPLE 5

8-Chloro-(4-ethylpiperazino)-6-(o-fluorophenyl)-4H-s-triazolo[4,3-a][1,4]benzodiazepine.

In the manner given in Example 1, 1-bromo-8-chloro-6-(o-fluorophenyl)-4H-s-triazolo[4,3-a][1,4]benzodiazepine is heated with excess of 4-ethylpiperazine to give 8-chloro-1-(4-ethylpiperazino)-6-(o-fluorophenyl)-4H-s-triazolo[4,3-a]-[1,4]benzodiazepine.

EXAMPLE 6

8-Chloro-1-[4-(2-hydroxyethyl)piperazino]-6-(o-fluorophenyl)-4H-s-triazolo[4,3-a][1,4]benzodiazepine.

In the manner given in Example 1, 1-bromo-8-chloro-6-(o-fluorophenyl)-4H-s-triazolo[4,3-a][1,4]benzodiazepine is heated with N-(β-hydroxyethyl)piperazine) to give 8-chloro-1-[4-(2-hydroxyethyl)piperazino]-6-(o-fluorophenyl)-4H-s-triazolo[4,3-a][1,4]benzodiazepine.

EXAMPLE 7

8-chloro-1-(4-methylpiperazino)-6-(o-nitrophenyl)-4H-s-triazolo[4,3-a][1,4]benzodiazepine.

In the manner given in Example 1, 1-bromo-8-chloro-6-(o-nitrophenyl)-4H-s-triazolo[4,3-a][1,4]benzodiazepine is heated with excess of 4-methylpiperazine to give 8-chloro-1-(4-methylpiperazino)-6-(o-nitrophenyl)-4H-s-triazolo-[4,3-a][1,4]benzodiazepine.

EXAMPLE 8

8-Chloro-1-[4-(2-hydroxyethyl)piperazino]-6-(o-nitrophenyl)-4H-s-triazolo[4,3-a][1,4]benzodiazepine.

In the manner given in Example 2, 1-bromo-8-chloro-6-(o-nitrophenyl)-4H-s-triazolo[4,3-a][1,4]benzodiazepine is heated with N-(β-hydroxyethyl)piperazine to give 8-chloro-1-[4-(2-hydroxyethyl)piperazino]-6-(o-nitrophenyl)-4H-s-triazolo[r,3-a][1,4]benzodiazepine.

EXAMPLE 9

8-chloro-(4-methylpiperazino)-6-(2,6-difluorophenyl)-4H-s-triazolo[4,3-a][1,4]benzodiazepine.

In the manner given in Example 1, 1-bromo-8-chloro-6-(2,6-difluorophenyl)-4H-s-triazolo[4,3-a][1,4]benzodiazepine is heated with excess of 4-methylpiperazine to give 8-chloro-1-(4-methylpiperazino)-6-(2,6-difluorophenyl)-4H-s-triazolo[4,3-a][1,4]benzodiazepine.

EXAMPLE 10

8-chloro-1-[4-(2-hydroxyethyl)piperazino]-6-(2,6-difluorophenyl)-4H-s-triazolo[4,3-a][1,4]benzodiazepine.

In the manner given in Example 2, 1-bromo-8-chloro-6-(2,6-difluorophenyl)-4H-s-triazolo[4,3-a][1,4]benzodia-zepine is heated with N-(β-hydroxyethyl)piperazine to give 8-chloro-1-[4-(2-hydroxyethyl)piperazino]-6-(2,6-difluorophenyl)-4H-s-triazolo[4,3-a][1,4]benzodiazepine.

EXAMPLE 11

8-Bromo-7-trifluoromethyl-1-(4-propylpiperazino)-6-(o-chlorophenyl)-4H-s-triazolo[4,3-a]-[1,4]benzodiazepine.

In the manner given in Example 1, 1,8-dibromo-7-trifluoromethyl-6-(o-chlorophenyl)-4H-s-triazolo[4,3-a]-[1,4]benzodiazepine is heated with excess of 4-propyl-piperazine to give 8-bromo-7-trifluoromethyl-1-(4-propylpiperazine to give 8-bromo-7-trifluoromethyl-1-(4-propylpiperazino)-6-(o-chlorophenyl)-4H-s-triazolo-[4,3-a][1,4]benzodiazepine.

EXAMPLE 12

8-Bromo-7-trifluoromethyl-1-[4-(2-hydroxy-ethyl)-piperazino]-6-(o-chlorophenyl)-4H-s-triazolo-[4,3-a][1,4]benzodiazepine.

In the manner given in Example 2, 1,8-dibromo-7-trifluoromethyl-6-(o-chlorophenyl)-4H-s-triazolo[4,3-a]-[1,4]benzodiazepine is heated with N-(β-hydroxyethyl)-piperazine to give 8-bromo-7-trifluoromethyl-1-[4-(2-hydroxyethyl)piperazino]-6-(o-chlorophenyl)-4H-s-triazolo[4,3-a][1,4]benzodiazepine.

EXAMPLE 13

8-fluoro-1-(4-methylpiperazino)-6-p-nitrophenyl)-4H-s-triazolo[4,3-a][1,4]benzodiazepine.

In the manner given in Example 1, 1-bromo-8-fluoro-6-(p-nitrophenyl)-4H-s-triazolo[4,3-a][1,4]benzodiazepine is heated with excess of 4-methylpiperazine to give 8-fluoro-1-(4-methylpiperazino)-6-(p-nitrophenyl)-4H-s-triazolo[4,3-a][1,4]benzodiazepine.

EXAMPLE 14

8bromo-9-nitro-1-(4-isopropylpiperazino)-6-o-(methylphenyl)-4H-s-triazolo[4,3-a][1,4]benzodiazepine.

In the manner given in Example 1, 1,8-dibromo-9-nitro-6-(o-methylphenyl)-4H-s-triazolo[4,3-a][1,4]benzodiazepine is heated with excess of 4-isopropylpiperazine to give 8-bromo-9-nitro-1-(4-isopropylpiperazino)-6-(o-methylphenyl)-4H-s-triazolo[4,3-a]-[1,4]benzodiazepine.

EXAMPLE 15

8-Bromo-9-nitro-1-[4-(2-hydroxyethyl)-piperazino]-6-(o-methylphenyl)-4H-s-triazolo[4,3-a]-[1,4]benzodiazepine.

In the manner given in Example 2, 1,8-dibromo-9-nitro-6-(o-methylphenyl)-4H-s-triazolo[4,3-a][1,4]-benzodiazepine is heated with N-(β-hydroxyethyl)piperazine to give 8-bromo-9-nitro-1-[4-(2-hydroxyethyl)-piperazine]-6-(o-methylphenyl)-4H-s-triazolo[4,3-a]-[1,4]benzodiazepine.

EXAMPLE 16

8-trifluoromethyl-1-[4-(2-hydroxyethyl)-piperazino]-6-phenyl-4H-s-triazolo[4,3-a][1,4]benzodiazepine.

In the manner given in Example 2, 1-bromo-8-trifluoromethyl-6-phenyl-4H-s-triazolo[4,3-a][1,4]benzodiazepine is heated with N-(β-hydroxyethyl)piperazine) to to give 8-trifluoromethyl-1-[4-(2-hydroxyethyl)piperazine]-6-phenyl-4H-s-triazolo[4,3-a][1,4]benzodiazepine.

EXAMPLE 17

8-trifluoromethyl-1-(4-methylpiperazino)-6-phenyl-4H-s-triazolo[4,3-a][1,4]benzodiazepine.

In the manner given in Example 1, 1-bromo-8-trifluoromethyl-6-phenyl-4H-s-triazolo[4,3-a][1,4]-benzodiazepine is heated with excess of 4-methylpiperazine to give 8-trifluoromethyl-1-(4-methylpiperazino)-6-phenyl-4H-s-triazolo[4,3-a][1,4]benzodiazepine.

EXAMPLE 18

8-nitro-1-[4-(2-hydroxyethyl)piperazine]-6-phenyl-4H-s-triazolo[4,3-a][1,4]benzodiazepine.

In the manner given in Example 2, 1-bromo-8-nitro-6-phenyl-4H-s-triazolo[4,3-a][1,4]benzodiazepine is heated with N-(β-hydroxyethyl)piperazine to give 8-nitro-1-[4-(2-hydroxyethyl)piperazine]-6-phenyl-4H-s-triazolo[4,3-a][1,4]benzodiazepine.

EXAMPLE 19

8-Nitro-1-(4-methylpiperazino)-6-phenyl-4H-s-triazolo[4,3-a][1,4]benzodiazepine.

In the manner given in Example 1, 1-bromo-8-nitro-6-phenyl-4H-s-triazolo[4,3-a][1,4]benzodiazepine is heated with excess of 4-methylpiperazine to give 8-nitro-1-(4-methylpiperazino)-6-phenyl-4H-s-triazolo-[4,3-a][1,4]benzodiazepine.

EXAMPLE 20

8-nitro-1-(4-ethylpiperazino)-6-phenyl-4H-s-triazolo[4,3-a][1,4]benzodiazepine.

In the manner given in Example 1, 1-bromo-8-nitro-6-phenyl-4H-s-triazolo[4,3-a][1,4]benzodiazepine is heated with excess of 4-ethylpiperazine to give 8-nitro-1-(4-ethylpiperazino)-6-phenyl-4H-s-triazolo[4,3-a]-[1,4]benzodiazepine.

Example 21

8-nitro-1-(4-methylpiperazino)-6-(o-chlorophenyl)-4H-s-triazolo[4,3-a][1,4]benzodiazepine.

In the manner given in Example 1, 1-bromo-8-nitro-6-(o-chlorophenyl)-4H-s-triazolo[4,3-a][1,4]benzodiazepine is heated with excess of 4-methylpiperazine to give 8-nitro-1-(4-methylpiperazino)-6-(o-chlorophenyl)-4H-s-triazolo[4,3-a][1,4]benzodiazepine.

EXAMPLE 22

8-nitro-1-[4-(2-hydroxyethyl)piperazino]-6-(o-chlorophenyl)-4H-s-triazolo[4,3-a][1,4]benzodiazepine.

In the manner given in Example 2, 1-bromo-8-nitro-6-(o-chlorophenyl)-4H-s-triazolo[4,3-a][1,4]benzodiazepine is heated with N-(β-hydroxyethyl)piperazine to give 8-nitro-1-[4-(2-hydroxyethyl)piperazino]-6-(o-chlorophenyl)-4H-s-triazolo[4,3-a][1,4]benzodiazepine.

EXAMPLE 23

8-chloro-1-piperazino-6-phenyl-4H-s-triazolo[4,3-a][1,4]benzodiazepine hemihydrate.

A mixture of 1-bromo-8-chloro-6-phenyl-4H-s-triazolo[4,3-a][1,4]benzodiazepine (1.87 g., 0.005 mole) and piperazine (8 g.) was heated under nitrogen at 105° for 18 hours. The cooled reaction mixture was mixed with water and extracted with methylene chloride. The extract was washed successively with water and brine, dried over sodium sulfate and concentrated. The residue was chromatographed in silica gel (100 g.) with methanol. The product thus obtained was crystallized once from ethyl acetate-hexane and twice from ethyl acetate to give 0.44 g. of 8-chloro-1-piperazino-6-phenyl-4H-s-triazolo[4,3-a][1,4]benzodiazepine hemihydrate of melting point 205°–208°. Additional product 0.08 g. of melting point 203°–206° and 0.30 g. of melting point 194°–203° was obtained from the mother liquor.

Anal. calcd. for $C_{20}H_{19}ClN_6 \cdot 1/2H_2O$: C, 61.93; H, 5.20; Cl, 9.14; N, 21.67, $H_2O$, 2.32. Found: C, 61.77; H, 5.22; Cl, 9.32; N, 21.49; $H_2O$, 1.94.

In the manner illustrated by the preceding examples other 1-piperazino-6-phenyl-4H-s-triazolo[4,3-a][1,4]-benzodiazepines of formula II can be produced. Representative compounds thus obtained include:

8-bromo-1-piperazino-6-phenyl-4H-s-triazolo[4,3-a][1,4]-benzodiazepine.
10-ethyl-1-(4-methylpiperazino)-6-phenyl-4H-s-triazolo-[4,3-a][1,4]benzodiazepine;
10-trifluoromethyl-1-(4-ethylpiperazino)-6-(2,4-dimethyl-phenyl)-4H-s-triazolo[4,3-a][1,4]benzodiazepine;
9-methyl-1-(4-propylpiperazino)-6-(p-fluorophenyl)-4H-s-triazolo[4,3-a][1,4]benzodiazepine;
9-methyl-1-(4-isopropylpiperazino)-(p-fluorophenyl-4H-s-triazolo[4,3-a][1,4]benzodiazepine;
7,10-dichloro-1-(4-methylpiperazino)-6-(m-nitrophenyl)-4H-s-triazolo[4,3-a][1,4]benzodiazepine;
4,7,9-triethyl-1-(4-methylpiperazino)-6-[o-(trifloromethyl)phenyl]-4H-s-triazolo[4,3-a][1,4]benzodiazepine;
8-chloro-1-(4-methylpiperazino)-6-(o-nitrophenyl)-4H-s-triazolo[4,3-a][1,4]benzodiazepine;
8-fluoro-1-(4-propylpiperazino)-6-phenyl-4H-s-triazolo-[4,3-a][1,4]benzodiazepine;
8-chloro-1-(4-ethylpiperazino)-6-(m-isopropylphenyl)-4H-s-triazolo[4,3-a][1,4]benzodiazepine;
9-fluro-4-methyl-1-(4-methylpiperazino)-6-(m-bromophenyl)-4H-s-triazolo[4,3-a][1,4]benzodiazepine;
8-ethyl-1-(4-isopropylpiperazino)-6-(o-nitrophenyl)-4H-s-triazolo[4,3-a][1,4]benzodiazepine;
8-trifluoromethyl-4-propyl-1-(4-methylpiperazino)-6-phenyl-4H-s-triazolo[4,3-a][1,4]benzodiazepine;
10-fluoro-7-chloro-1-piperazino-6-(p-trifluoromethylphenyl)-4H-s-triazolo[4,3-a][1,4]benzodiazepine;
10-ethyl-1-[4-(2-hydroxyethyl)piperazino]-6-phenyl-4H-s-triazolo[4,3-a][1,4]benzodiazepine;
10-trifluoromethyl-1-[4-(2-hydroxyethyl)piperazino]-6-(2,4-dimethylphenyl)-4H-s-triazolo[4,3-a][1,4]benzodiazepine;
9-methyl-1-6-(p-fluorophenyl)-4H-s-triazolo[4,3-a][1,4]-benzodiazepine;
7,10-dichloro-1-(4-methylpiperazino)-6-(m-nitrophenyl)-4H-s-triazolo[4,3-a][1,4]benzodiazepine;
4,7,9-triethyl-1-(4-methylpiperazino)-6-(o-trifluoromethylphenyl)-4H-s-triazolo[4,3-a][1,4]benzodiazepine;
8-chloro-1-(4-methylpiperazino)-6-(o-nitrophenyl)-4H-s-triazolo[4,3-a][1,4]benzodiazepine;
9-fluoro-4-methyl-1-(4-methylpiperazino)-6-(m-bromophenyl)-4H-s-triazolo[4,3-a][1,4]benzodiazepine;
8-trifluoromethyl-4-propyl-1-(4-methylpiperazino)-6-phenyl-4H-s-triazolo[4,3-a][1,4]benzodiazepine;
8-bromo-6-phenyl-1-piperazino-4H-s-triazolo[4,3-a][1,4]-benzodiazepine;
8-chloro-6-(o-chlorophenyl)-1-piperazino-4H-s-triazolo-[4,3-a][1,4]benzodiazepine;
6-(o-chlorophenyl)-1-piperazino-4H-s-triazolo[4,3-a]-[1,4]benzodiazepine;
6-phenyl-1-piperazino-4H-s-triazolo[4,3-a][1,4]benzodiazepine;
6-(o-chlorophenyl-1-(4-methylpiperazino)-4H-s-triazolo-[4,3-a][1,4]benzodiazepine;

6-(o-chlorophenyl)-1-[4-(2-hydroxyethyl)piperazino]-4H-s-triazolo[4,3-a][1,4]benzodiazepine;

8-chloro-1-(4-ethylpiperazino)-6-phenyl-4H-s-triazolo-[4,3-a][1,4]benzodiazepine;

8-chloro-6-(o-chlorophenyl)-1-(4-ethylpiperazino)-4H-s-triazolo[4,3-a][1,4]benzodiazepine;

6-(o-chlorophenyl)-1-(4-ethylpiperazino)-4H-s-triazolo-[4,3-a][1,4]benzodiazepines; and the like.

Treating the compounds of Formula II with pharmacologically acceptable acids such as hydrochloric, hydrobromic, phosphoric, sulfuric, acetic, propionic, toluenesulfonic, methanesulfonic, tartaric, citric, lactic, malic, maleic, and cyclohexanesulfamic acids produces the pharmacologically acceptable salts of these compounds of Formula 11 which can be used like the free base compounds of Formula II Salt formation is achieved in conventional manner by reacting the compounds of Formula II with excess of a selected acid in a suitable medium e.g. water, a lower alkanol, ether, or acetone and recovering the salt by evaporating the solvent, preferably in vacuo.

I claim:

1. A compound of the formula II

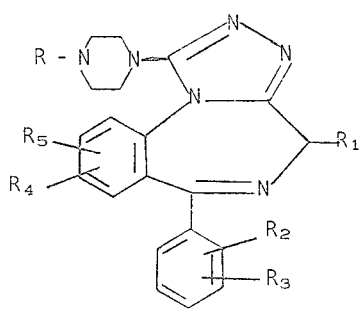

11 wherein R is hydrogen, alkyl of 1 to 3 carbon atoms, inclusive, or β-hydroxyethyl; wherein $R_1$ is hydrogen or alkyl defined as above; and wherein $R_2$, $R_3$, $R_4$ and $R_5$ are hydrogen, alkyl as defined above, fluoro, chloro, bromo, nitro or trifluoromethyl, and the pharmacologically acceptable acid addition salts thereof.

2. A compound according to claim 1 having the formula II A:

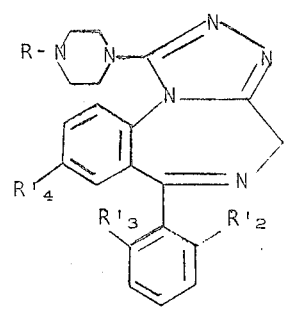

II A wherein R is hydrogen, alkyl of 1 to 3 carbon atoms, inclusive, and β-hydroxyethyl; $R'_2$ and $R'_3$ are hydrogen, fluoro or chloro, and $R'_4$ is hydrogen, fluoro, chloro, bromo, nitro, trifluoromethyl, and the pharmacologically acceptable acid addition salt of the compounds of formula II A.

3. A compound according to claim 1 having the formula II B:

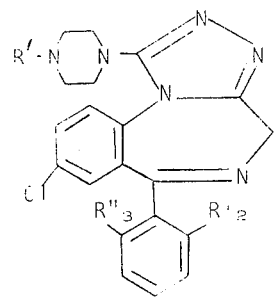

II B wherein R′ is methyl or β-hydroxyethyl, wherein $R'_2$ is hydrogen, chloro, or fluoro; and wherein $R''_3$ is hydrogen or fluoro, and the pharmacologically acceptable acid addition salts thereof.

4. A compound according to claim 3, wherein R′ is methyl, $R'_2$ and $R''_3$ are hydrogen and the compound is therefore 8-chloro-1-(4-methylpiperazino)-6-phenyl-4H-s-triazolo[4,3-a][1,4]benzodiazepine.

5. A compound according to claim 3 wherein R′ is β-hydroxyethyl, $R'_2$ and $R''_3$ are hydrogen, and the compound is therefore 8-chloro-1-[4-(2-hydroxyethyl)piperazino]-6-phenyl-4H-s-triazolo[4,3-a][1,4]benzodiazepine.

6. A compound according to claim 3, wherein R′ is methyl, $R'_2$ is chloro, $R''_3$ is hydrogen, and the compound is therefore 8-chloro-1-(4-methylpiperazino)-6-(o-chlorophenyl)-4-H-s-triazolo[4,3-a][1,4]benzodiazepine.

7. A compound according to claim 3 wherein R′ is β-hydroxyethyl, $R'_2$ is chloro, $R''_3$ is hydrogen and the compound is therefore 8-chloro-1-[4-(2-hydroxyethyl)-piperazino]-6-(o-chlorophenyl)-4H-s-triazolo[4,3-a]-[1,4]benzodiazepine.

8. A compound according to claim 2, where R is methyl, $R'_2$ and $R'_3$ are hydrogen, $R'_4$ is nitro and the compound is therefore 8-nitro-1-(4-methylpiperazino)-6-phenyl-4H-s-triazolo[4,3-a][1,4]benzodiazepine.

9. A compound according to claim 2 as a hemihydrate, wherein R, $R'_2$ and $R'_3$ are hydrogen, $R'_4$ is chloro, and the compound is therefore 8-chloro-1-piperazino-6-phenyl-4H-s-triazolo[4,3-a][1,4]benzodiazepine hemihydrate.

10. A process for the production of a compound of the formula II

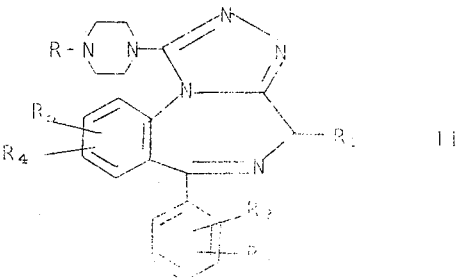

11 wherein R is hydrogen, alkyl of 1 to 3 carbon atoms, inclusive, or β-hydroxyethyl; wherein $R_1$ is hydrogen or alkyl defined as above; and wherein $R_2$, $R_3$, $R_4$ and $R_5$ are hydrogen, alkyl as defined above, fluoro, chloro, bromo, nitro or trifluoromethyl, which comprises: heating to 100°–150° C. a compound of the formula:

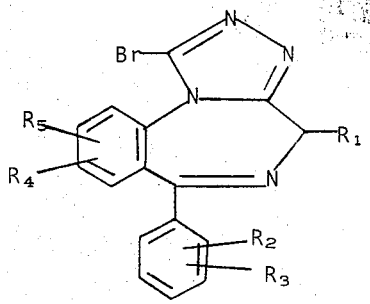
wherein $R_1$, $R_2$, $R_3$, $R_4$ and $R_5$ are defined as above, with a piperazine of the formula:
wherein R is defined as above, to obtain a compound of formula II above.
* * * * *